US008823870B2

United States Patent
Tsai et al.

(10) Patent No.: US 8,823,870 B2
(45) Date of Patent: Sep. 2, 2014

(54) PORTABLE ELECTRONIC DEVICE

(71) Applicant: Wistron Corporation, New Taipei (TW)

(72) Inventors: Tsung-Ying Tsai, New Taipei (TW);
Jing-Tang Wu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 13/831,867

(22) Filed: Mar. 15, 2013

(65) Prior Publication Data
US 2014/0016031 A1    Jan. 16, 2014

(30) Foreign Application Priority Data

Jul. 11, 2012    (TW) .............................. 101124953 A (51) Int. Cl.
*H04N 5/225*    (2006.01)
*G06F 1/16*    (2006.01)
(52) U.S. Cl.
CPC .................................. *G06F 1/1686* (2013.01)
USPC ......................................... 348/373; 348/376
(58) Field of Classification Search
CPC ............. H04N 5/2251–5/2254; H04N 5/2257; H04N 5/225
USPC .................................... 348/373–376, 207.99
See application file for complete search history.

(56) References Cited

U.S. PATENT DOCUMENTS

| 6,812,958 | B1 * | 11/2004 | Silvester .................... 348/207.1 |
| 7,435,018 | B2 * | 10/2008 | Huang et al. .................. 396/419 |
| 7,611,294 | B2 * | 11/2009 | Shi et al. ........................ 396/428 |
| 2007/0253703 | A1 * | 11/2007 | Tsai et al. ..................... 396/429 |
| 2010/0102979 | A1 | 4/2010 | Huang et al. |
| 2011/0115924 | A1 | 5/2011 | Yu et al. |
| 2011/0182029 | A1 | 7/2011 | Wu et al. |

FOREIGN PATENT DOCUMENTS

TW            M367362         10/2009

* cited by examiner

*Primary Examiner* — Sinh Tran
*Assistant Examiner* — Zhenzhen Wu
(74) *Attorney, Agent, or Firm* — Jianq Chyun IP Office (57) ABSTRACT

A portable electronic device including a first body and an image capturing module is provided. The first body has a housing with an opening. The image capturing module is movably disposed in the housing, and includes a circuit board, an image capturing unit and a driving mechanism. The image capturing unit is disposed on the circuit board. The driving mechanism is configured to drive the circuit board. When the driving mechanism is operated in a first state, the driving mechanism drives the circuit board to move towards a predetermined direction relative to the housing, so that the image capturing unit moves to a first position aligned to the opening and is exposed. When the driving mechanism is operated in a second state, the driving mechanism drives the circuit board to move towards another direction, so that the image capturing unit leaves the opening and is shielded at a second position.

18 Claims, 9 Drawing Sheets

PORTABLE ELECTRONIC DEVICE

CROSS-REFERENCE TO RELATED APPLICATION

This application claims the priority benefit of Taiwan application serial no. 101124953, filed on Jul. 11, 2012. the entirety of the above-mentioned patent application is hereby incorporated by reference herein and made a part of this specification.

BACKGROUND

1. Technical Field

The invention relates to a portable electronic device. Particularly, the invention relates to a portable electronic device having an image capturing module.

2. Related Art

Along with development of technology, computers and peripherals thereof are widely used, in which camera devices are widely used in portable electronic devices to meet the demand for more convenient life. For example, a user uses a computer's webcam to capture an environmental image of this side, and transmits the environmental image of this side to a computer on the other side through a network communication program, and then the environmental image of this side is played through a screen of the computer on the other side. Moreover, a user of the other side can also transmit images to the user of this side through a same manner. In this way, a communication channel between friends is established, or user of different places may synchronously take part in a videoconference.

However, with quick development of technology, user's privacy becomes insecure. The conventional webcam is preset to be unshielded and can be always in a use state, so that after the user uses video or communication software, if the user forgets to turn off the webcam function, the user's privacy is revealed to others. Alternatively, if the portable electronic device is invaded by a hacker, the webcam is probably controlled and turned on, and the environmental images of the user's side is revealed or even recorded by the hacker, which is a violation of the user's privacy.

SUMMARY

The invention is directed to a portable electronic device, in which an image capturing unit is exposed or shielded along with rotation of a driving mechanism.

The invention provides a portable electronic device including a first body and an image capturing module. The first body has a housing with an opening. The image capturing module is movably disposed in the housing. The image capturing module includes a circuit board, an image capturing unit and a driving mechanism. The image capturing unit is disposed on the circuit board. The driving mechanism is disposed in the housing and configured to drive the circuit board. When the driving mechanism is operated in a first state, the driving mechanism drives the circuit board to move towards a predetermined direction relative to the housing, so that the image capturing unit moves correspondingly to a first position aligned to the opening and is exposed. When the driving mechanism is operated in a second state, the driving mechanism drives the circuit board to move towards another predetermined direction relative to the housing, so that the image capturing unit leaves correspondingly the opening to reach a second position and is shielded by the housing.

In an embodiment of the invention, the driving mechanism of the portable electronic device is rotatably disposed on the housing and includes a follower and a rotary knob. The follower is disposed in the housing and is used to opportunely push the circuit board. The rotary knob is fixed to the follower and protrudes out of the housing. The rotary knob drives the follower to rotate relative to the housing, so as to drive the circuit board to move.

In an embodiment of the invention, the rotary knob of the portable electronic device has a set of hooks. The follower has a hole. The set of hooks penetrate though the hole and are engaged to the hole.

In an embodiment of the invention, the follower of the portable electronic device is an elliptic plate having two ends. An edge of the follower is configured to contact an edge of the circuit board.

In an embodiment of the invention, the housing of the portable electronic device has a first positioning pillar and a second positioning pillar relative to the rotary knob. At least one end of the follower has a notch. When the image capturing unit is aligned to the opening and is exposed at the first position, the notch is engaged to the first positioning pillar. When the rotary knob drives the notch of the follower to leave the first positioning pillar and rotate by a predetermined angle, the notch is engaged to the second positioning pillar, and the image capturing unit leaves correspondingly the opening and is shielded at the second position.

In an embodiment of the invention, the driving mechanism of the portable electronic device is rotatably disposed in the housing and has a driving pin. A position of the driving pin is away from a rotation axis to present an eccentric state. The circuit board correspondingly has a guide slot. The driving pin penetrates through the guide slot. When the driving mechanism rotates relative to the housing, the driving pin pushes or pulls an edge of the guide slot to drive the circuit board to move.

In an embodiment of the invention, the guide slot has a straight bar shape, and an extending direction of the guide slot is perpendicular to a moving direction of the circuit board.

In an embodiment of the invention, the housing of the portable electronic device further has a first pit and a second pit. The circuit board has a positioning bump. When the image capturing unit moves correspondingly to the first position aligned to the opening and is exposed, the first pit is engaged to the positioning bump. When the rotation mechanism drives the positioning bump of the circuit board to leave the first pit and rotate by a predetermined angle, the second pit is engaged to the positioning bump, and the image capturing unit leaves correspondingly the opening, and is shielded at the second position.

In an embodiment of the invention, the housing of the portable electronic device has a plurality of position limiting parts, which are used to limit the circuit board to move relative to the housing only along a single direction.

In an embodiment of the invention, the position limiting parts include a plurality of buckle portions and a plurality of supporting portions. The circuit board has a first surface and a second surface opposite to the first surface. The buckle portions press the first surface of the circuit board, and the second surface of the circuit board leans against the supporting portions.

In an embodiment of the invention, the portable electronic device further includes an elastic element connected between the housing and the circuit board, which provides an elastic force on the circuit board along a direction opposite to a force exerting direction of the driving mechanism, so that the circuit board is recovered to an original position in case that the driving mechanism does not exert a force.

In an embodiment of the invention, the housing of the portable electronic device further has a hook, and the circuit board has a through hole. Two ends of the elastic element respectively hook the hook and penetrate through the through hole.

In an embodiment of the invention, the housing of the portable electronic device further has a first hook. The circuit board further has a second hook. Two ends of the elastic element respectively hook the first hook and the second hook.

In an embodiment of the invention, the portable electronic device further includes a touch screen assembled to the housing of the first body.

In an embodiment of the invention, the portable electronic device further includes a second body pivotally connected to the first body. The first body further has a display screen, and the second body has a keyboard.

According to the above descriptions, in the portable electronic device of the invention, the driving mechanism is configured, and the user can select to expose or shield the image capturing unit.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
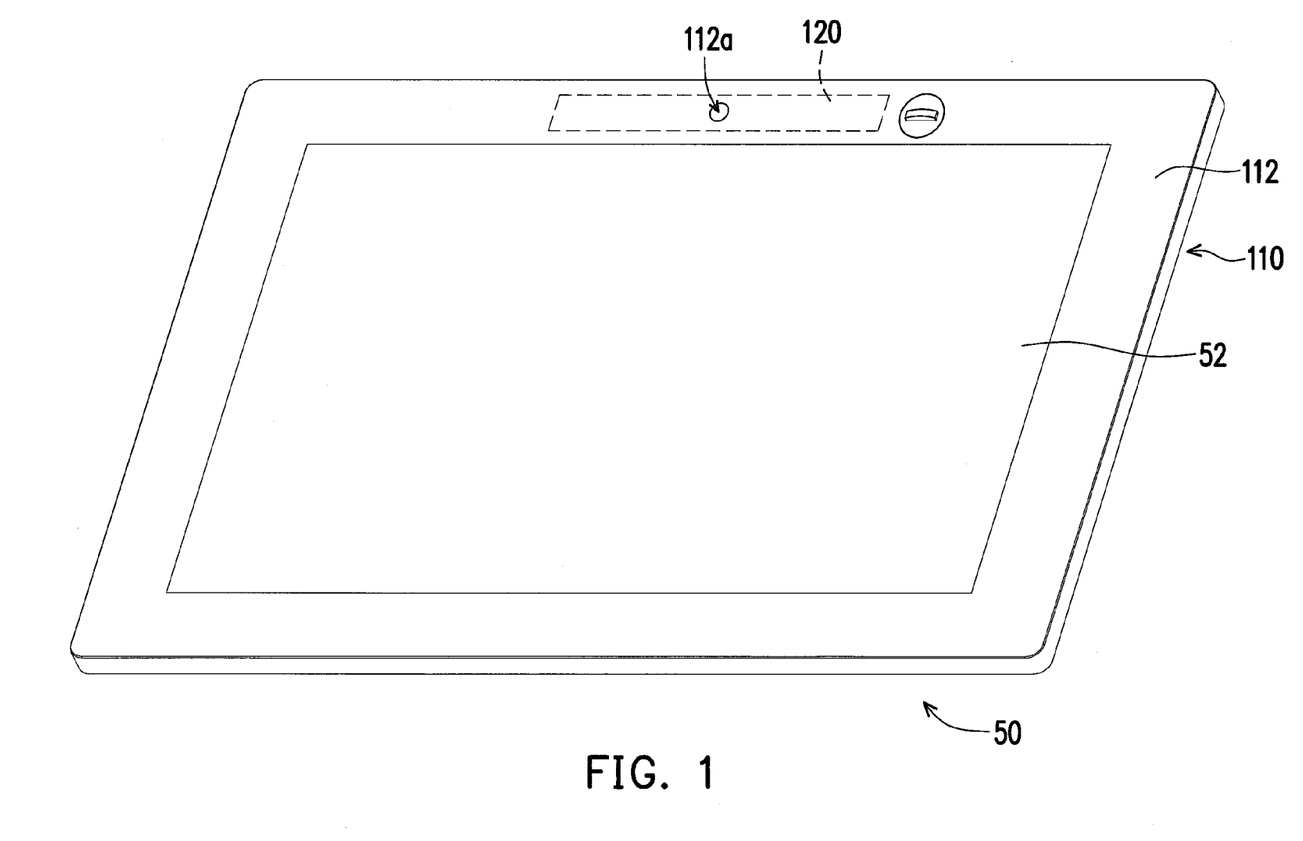
FIG. 1 is a three-dimensional view of a portable electronic device according to an embodiment of the invention.

FIG. 1 is a three-dimensional view of a portable electronic device according to an embodiment of the invention. Referring to FIG. 1, in the present embodiment, the portable electronic device 50 is a tablet personal computer (PC), which includes a first body 110, an image capturing module 120 and a touch screen 52. The first body 110 has a housing 112. The housing 112 has an opening 112a, and the opening 112a is used to expose partial component of the image capturing module 120. The touch screen 52 is assembled to the housing 112 of the first body 110, and a user can operate the portable electronic device 50 through the touch screen 52, and capture required images through the image capturing module 120.

Figure 2:
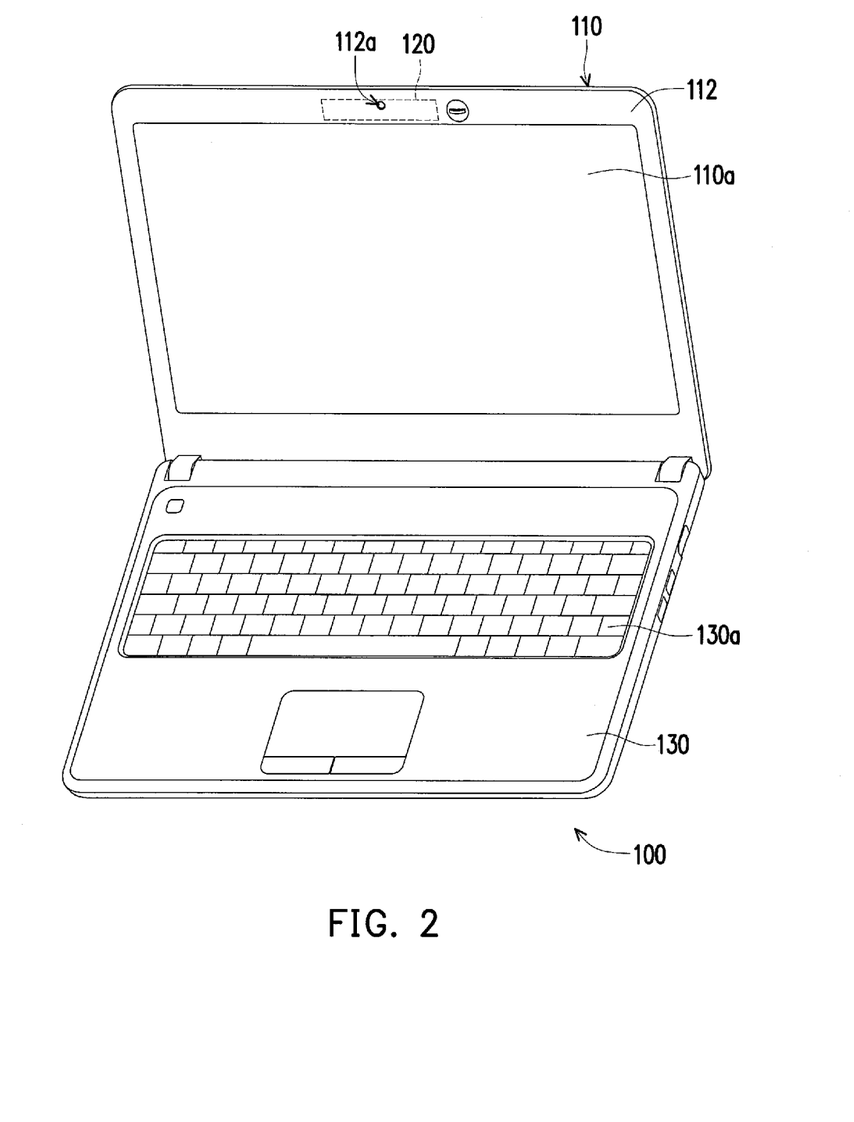
FIG. 2 is a three-dimensional view of a portable electronic device according to another embodiment of the invention.

FIG. 2 is a three-dimensional view of a portable electronic device according to another embodiment of the invention. Referring to FIG. 2, the portable electronic device 100 of the present embodiment is a notebook computer. The portable electronic device 100 includes a first body 110, an image capturing module 120 and a second body 130, where the second body 130 is pivotally connected to the first body 110. In other words, the portable electronic device 100 is the notebook computer integrating a display module (the first body 110) and an input module (the second body 130). The first body 110 may include a display screen 110a, and the second body 130 may include a keyboard 130a. The user operates the portable electronic device 100 through the keyboard 130a, and views images displayed by the display screen 110a, and further captures required images through the image capturing module 120. The portable electronic device of the invention is not limited to the tablet PC or the notebook computer, and other portable electronic device having the image capturing module may also applied the design of the invention.

Figure 3A:
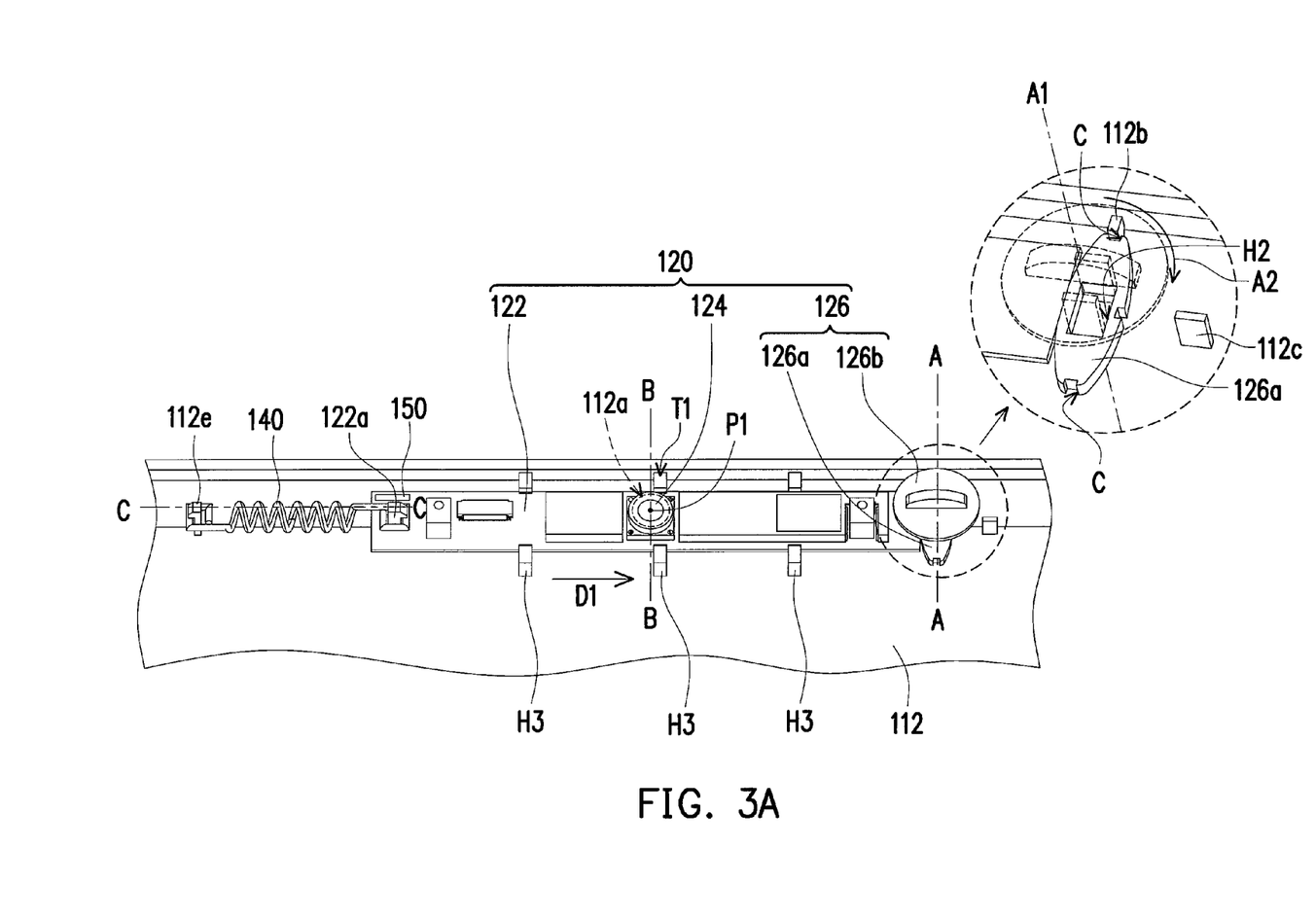
FIG. 3A is a schematic diagram illustrating a situation that an image capturing module of FIG. 2 is aligned to an opening and partial component thereof is exposed.
Figure 3B:
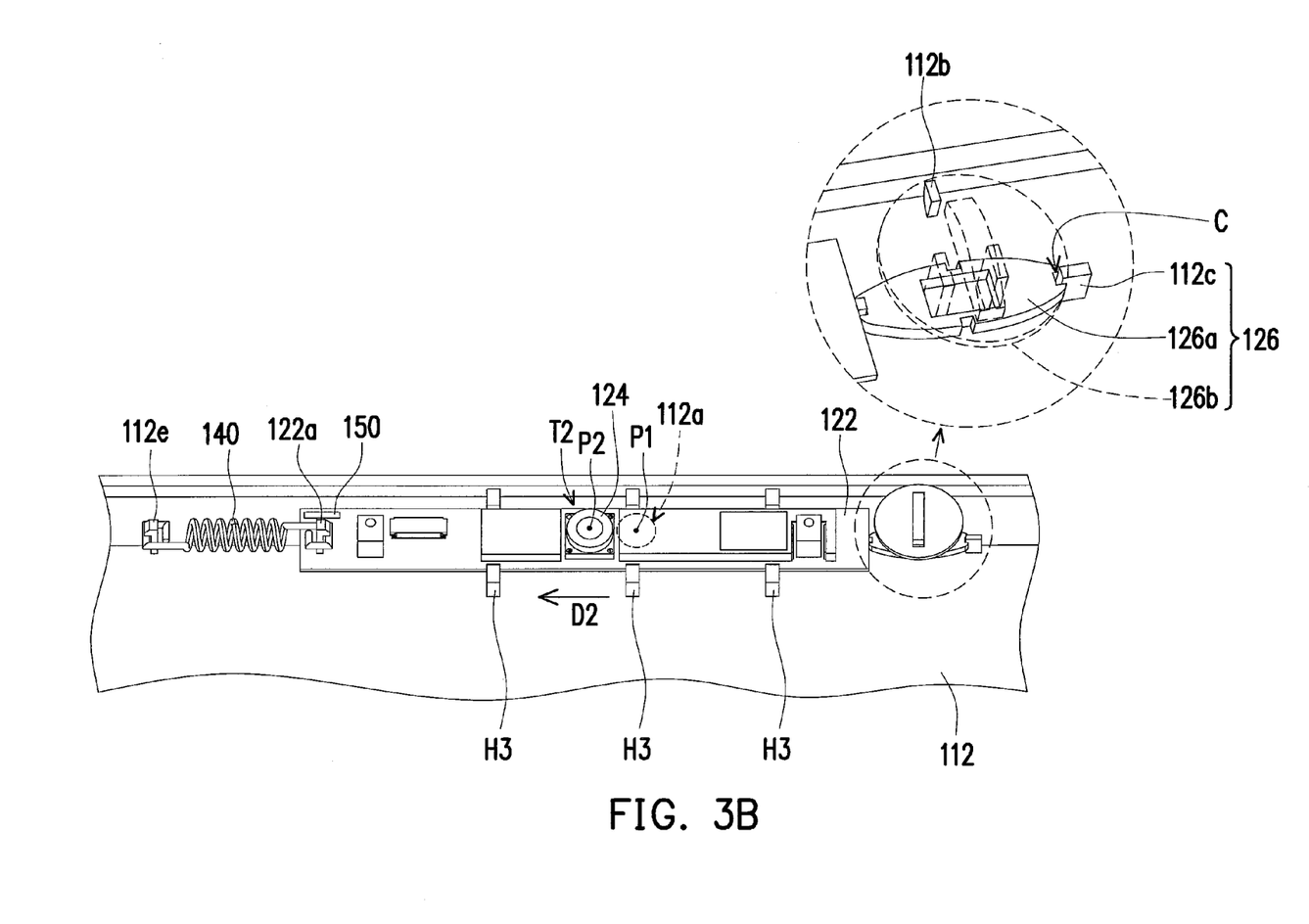
FIG. 3B is a schematic diagram illustrating a situation that the image capturing module of FIG. 3A moves relative to a housing and partial component thereof is shielded.

FIG. 3A is a schematic diagram illustrating a situation that the image capturing module of FIG. 2 is aligned to the opening and partial component thereof is exposed. FIG. 3B is a schematic diagram illustrating a situation that the image capturing module of FIG. 3A moves relative to the housing and partial component thereof is shielded. In FIG. 3A and FIG. 3B, the opening is represented by dot lines, and a part of the housing is omitted to facilitate describing the members covered by the housing. Referring to FIG. 3A and FIG. 3B, the image capturing module 120 is movably disposed in the housing 112. The image capturing module 120 includes a circuit board 122, an image capturing unit 124 and a driving mechanism 126.

In the present embodiment, the driving mechanism 126 is rotatably disposed on the housing 112. A part of the driving mechanism 126 is exposed out of the housing 112 to facilitate user's manipulation, and another part of the driving mechanism 126 is hided in the housing 112 for driving the circuit board 122, though the driving mechanism is not limited to be rotatably disposed on the housing 112, and the spirit of the invention is met as long as an effect that a part of the driving mechanism contacts the circuit board 122 and opportunely pushes (or pulls) the circuit board 122 is achieved as that described in follow-up descriptions. The opening 112a is used to selectively expose the image capturing unit 124. Certainly, in an actual application, in order to avoid dust pollution and other problems, a transparent protection element can be used to cover the opening 112a. Alternatively, the housing 112 may use a transparent material and is coated with coatings, where the opening 112a is not coated with the coatings. In detail, when the driving mechanism 126 rotates along a rotation axis A1, the driving mechanism 126 drives the circuit board 122 to move linearly relative to the housing 112 along a limited direction. Therefore, when the driving mechanism 126 is operated in a first state T1, the driving mechanism 126 drives the circuit board 122 to move towards a predetermined direction D1 relative to the housing 112, so that the image capturing unit 124 moves correspondingly to a first position P1 aligned to the opening 112*a* and is exposed in the first state T1 as that shown in FIG. 3A. When the driving mechanism 126 is operated in a second state T2, the driving mechanism 126 drives the circuit board 122 to move towards another predetermined direction D2 relative to the housing 112, so that the image capturing unit 124 leaves correspondingly the opening 112*a* to reach a second position P2 and is shielded by the housing 112 in the second state T2 as that shown in FIG. 3B.

By using the driving mechanism 126, the image capturing unit 124 can be exposed by the opening 112*a* or shielded by the housing 112. Therefore, when the user wants to use the image capturing unit 124, the user uses the driving mechanism 126 to drive the image capturing unit 124 to move, so that the image capturing unit 124 is exposed by the opening 112*a*. When the image capturing unit 124 is not used, the user uses the driving mechanism 126 to drive the image capturing unit 124 to leave correspondingly the opening 112*a*, so that the image capturing unit 124 is shielded by the housing 112. In this way, user's privacy is effectively protected to avoid a situation that the image of the user is inadvertently capture or maliciously captured for spreading out.

A structure of the driving mechanism 126 is further described below. In the present embodiment, the driving mechanism 126 is rotatably disposed on the housing 112 and includes a follower 126*a* and a rotary knob 126*b*. The follower 126*a* is disposed in the housing 112 and is used to opportunely push the circuit board 122. The rotary knob 126*b* is fixed to the follower 126*a* and protrudes out of the housing 112. The rotary knob 126*b* drives the follower 126*a* to rotate relative to the housing 112, so as to drive the circuit board 122 to move.

In detail, in a process that the rotary knob 126*b* is rotated from the first state T1 shown in FIG. 3A to the second state T2 shown in FIG. 3B, the follower 126*a* is driven by the rotary knob 126*b* and is rotated relative to the housing 112, and meanwhile an edge of the follower 126*a* contacts an edge of the circuit board 122 to drive the circuit board 122 to move relative to the housing 112 along the predetermined direction D2, so that the image capturing unit 124 is changed from the first position P1 where the image capturing unit 124 is exposed by the opening 112*a* to the second position P2 where the image capturing unit 124 is shielded by the housing 112.

When the user wants to use the image capturing unit 124, in a process that the rotary knob 126*b* is rotated from the second state T2 shown in FIG. 3B to the first state T1 shown in FIG. 3A, the follower 126*a* is driven by the rotary knob 126*b* and is rotated relative to the housing 112. Meanwhile, the edge of the follower 126*a* contacts the edge of the circuit board 122 to drive the circuit board 122 to move relative to the housing 112 along the predetermined direction D1, so that the image capturing unit 124 is changed from the second position P2 where the image capturing unit 124 is shield by the housing 112 to the first position P1 where the image capturing unit 124 is exposed by the opening 112*a*.

Moreover, the portable electronic device 100 further includes a switch module 150, which is disposed on the circuit board 122, and is electrically connected to the image capturing unit 124 for turning on/off the image capturing unit 124. The switch module 150 of the present embodiment is, for example, a mechanical switch. In this way, when the follower 126*a* is driven by the rotary knob 126*b* to drive the image capturing unit 124 to move relative to the housing 112, and when the image capturing unit 124 is moved to the second position P2 and is shielded, the switch module 150 is triggered to turn off the image capturing unit 124, and when the image capturing unit 124 is moved to the first position P1 and is exposed or departs from the second position P2, the switch module 150 is triggered to turn on the image capturing unit 124. Triggering of the switch module 150 can be implemented through opportune interference of an interference point configured beside the circuit board 122 adjacent to the housing 112. However, the switch module 150 can also be implemented through optical detection, and since the triggering methods of the switch module are familiar by those skilled in the art, details thereof are not repeated.

The housing 112 of the present embodiment has a first positioning pillar 112*b* and a second positioning pillar 112*c* relative to the rotary knob 126*b*. Moreover, the follower 126*a* is an elliptic plate having two ends, and the two ends respectively have a notch C. Here, the shape of the follower 126*a* is, for example, an ellipse, though any shape of the follower can be used as long as the follower can be rotated relative to the housing to drive the circuit board to move. When the image capturing unit 124 is moved to the first position P1 aligned to the opening 112*a* and is exposed, shown as an amplified part of FIG. 3A, the notch C of one end of the follower 126*a* is engaged to the first positioning pillar 112*b*, so as to prevent the other end of the follower 126*a* from further pushing the circuit board 122 to move relative to the housing 112, and fix positions of the follower 126*a* and the circuit board 122. In this way, the image capturing unit 124 is kept in the first position P1 aligned to the opening 112*a* and is exposed. On the other hand, when a suitable force is exerted to rotate the rotary knob 126*b* to drive the notch C of the follower 126*a* to leave the first positioning pillar 112*b* and rotate by a predetermined angle A2 (for example, 90 degrees), shown as an amplified part of FIG. 3B, the notch C is engaged to the second positioning pillar 112*c* to keep a state of pushing the circuit board 122 and fix positions of the follower 126*a* and the circuit board 122. Moreover, the image capturing unit 124 leaves correspondingly the opening 112*a* and is shielded at the second position P2.

Figure 4:
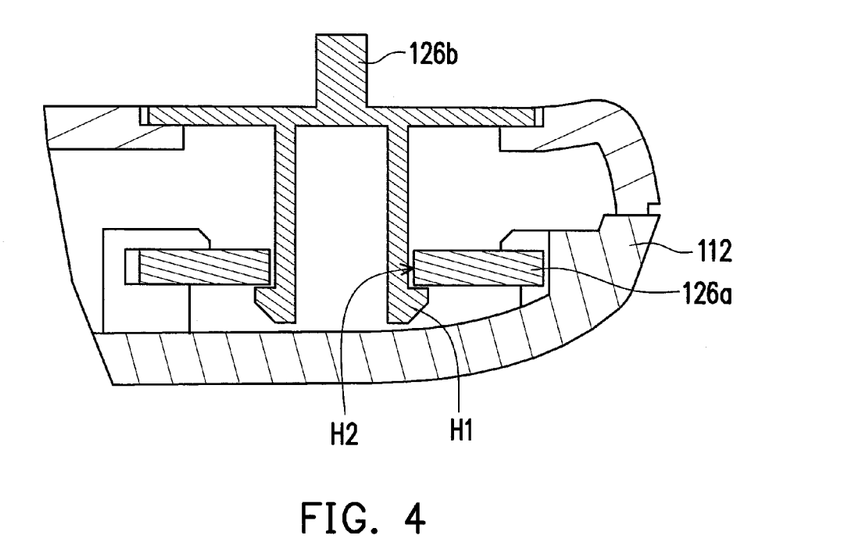
FIG. 4 is a cross-sectional view of a driving mechanism of FIG. 3A along an A-A line.

FIG. 4 is a cross-sectional view of the driving mechanism of FIG. 3A along an A-A line. Referring to FIG. 3A and FIG. 4, in the present embodiment, the rotary knob 126*b* has a set of hooks H1. The follower 126*a* has a hole H2. The set of hooks H1 penetrate though the hole H2 and are engaged to the hole H2, so as to fix the rotary knob 126*b* to the follower 126*a*, so that when the rotary knob 126*b* is rotated, it drives the follower 126*a* to rotate. However, the invention is not limited thereto, and in other embodiments, the rotary knob 126*b* and the follower 126*a* can be formed integrally.

Figure 5:
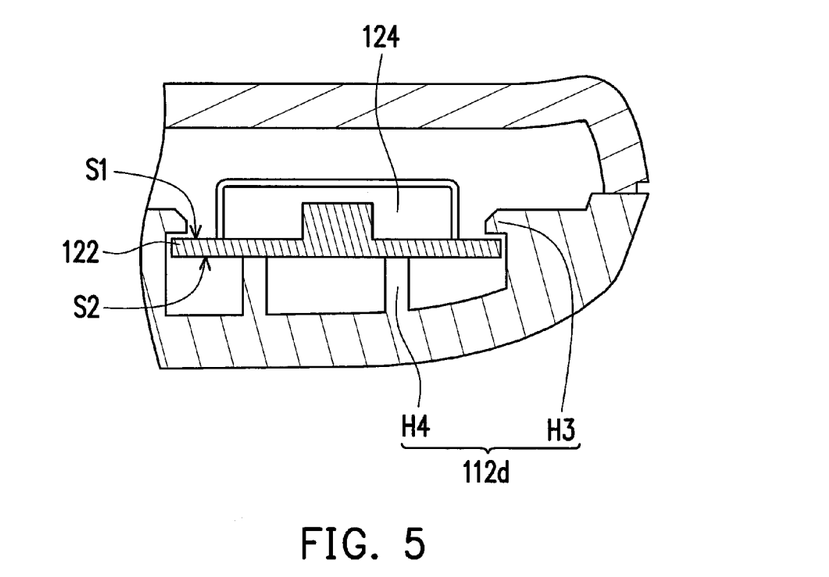
FIG. 5 is a cross-sectional view of the image capturing module of FIG. 3A along a B-B line.

FIG. 5 is a cross-sectional view of the image capturing module of FIG. 3A along a B-B line. Referring to FIG. 3A and FIG. 5, in the present embodiment, the housing 112 further has a plurality of position limiting parts. In detail, the position limiting parts 112*d* include a plurality of buckle portions H3 and a plurality of supporting portions H4. The circuit board 122 has a first surface S1 and a second surface S2 opposite to the first surface S1. The buckle portions H3 (six buckle portions are illustrated) press the first surface S1 of the circuit board 122, and the second surface S2 leans against the supporting portions H4. In this way, the position limiting parts 112*d* limit the circuit board 122 to move relative to the housing 112 only along a single direction.

Figure 6:
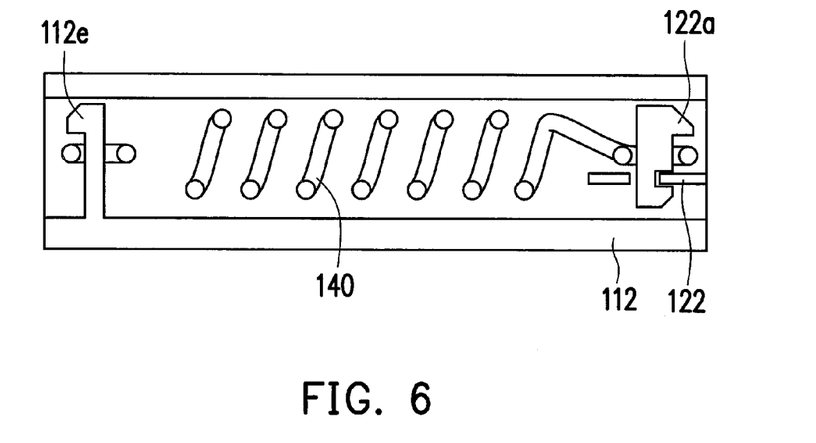
FIG. 6 is a cross-sectional view of the image capturing module of FIG. 3A along a C-C line.

FIG. 6 is a cross-sectional view of the image capturing module of FIG. 3A along a C-C line. Referring to FIG. 6, in the present embodiment, the portable electronic device 100 further includes an elastic element 140, which is connected between the housing 112 and the circuit board 122. In detail, the housing 112 further has a first hook 112*e*, and the circuit board 122 further has a second hook 122*a*. Two ends of the elastic element 140 respectively hook the first hook 112e and the second hook 122a. When the circuit board 122 is no longer pushed due to rotation of the follower 126a, the elastic element 140 provides an elastic force on the circuit board 122 along a direction opposite to a force exerting direction of the driving mechanism 126, so that the circuit board 122 can be recovered to an original position (the first position P1 of FIG. 3A) in case that the driving mechanism 126 does not exert a force, i.e. the elastic element 140 drives the image capturing unit 124 to move from the second position P2 where the image capturing unit 124 is shielded as that shown in FIG. 3B to the first position P1 aligned to the opening 112a as that shown in FIG. 3A. In the present embodiment, the elastic element 140 is compressed as the image capturing module 124 moves correspondingly to the second position P2 where the image capturing unit 124 is shielded, and provides an elastic restoring force pushing outwards (opposite to the force exerting direction of the driving mechanism 126). Those skilled in the art should understand that the elastic element can also be configured at another end of the circuit board and can be pulled as the image capturing module 124 moves correspondingly to the second position P2 where the image capturing unit 124 is shielded, so as to provide the elastic restoring force pulling backwards, which are all within the protection scope of the invention.

Figure 7:
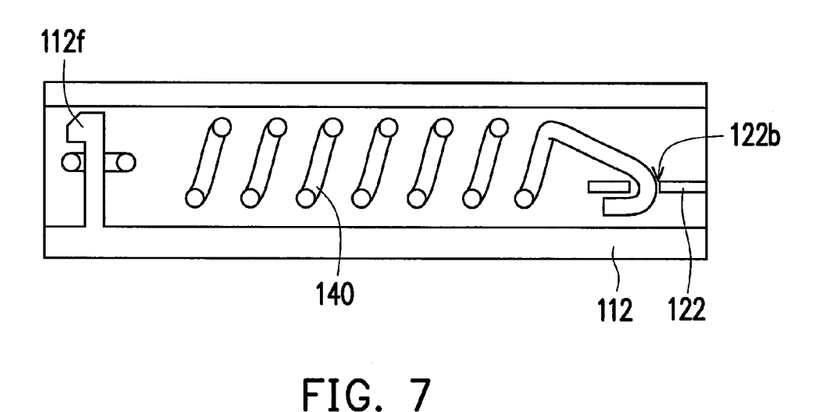
FIG. 7 is a cross-sectional view of the image capturing module of FIG. 6 along a C-C line according to a varied embodiment of the invention.

FIG. 7 is a cross-sectional view of the image capturing module of FIG. 6 along a C-C line according to a varied embodiment of the invention. In the varied embodiment of FIG. 7, the housing 112 further has a hook 112f, and the circuit board 122 has a through hole 122b, and the two ends of the elastic element 140 respectively hook the hook 112f and penetrate through the through hole 122b. Namely, the circuit board 122 of such variation is unnecessary to use the second hook 122a shown in FIG. 6. Any assembling method can be used to connect the elastic element between the housing and the circuit board.

It should be noticed that although the aforementioned embodiment introduces the image capturing module of the notebook computer of FIG. 2, the portable electronic device or FIG. 1 or the other portable electronic devices can also use the design of the image capturing module 120 and the driving mechanism 126 of FIG. 2.

Figure 8:
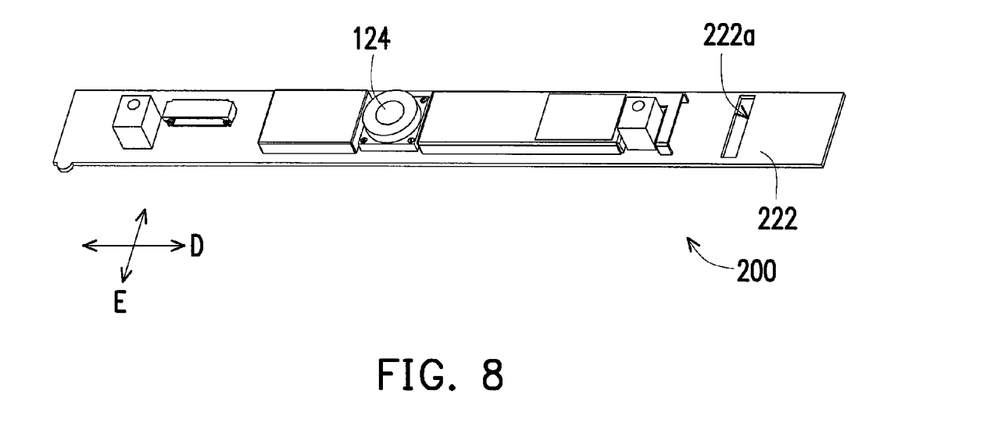
FIG. 8 is a schematic diagram of an image capturing module of FIG. 2 according to another embodiment of the invention.
Figure 9:
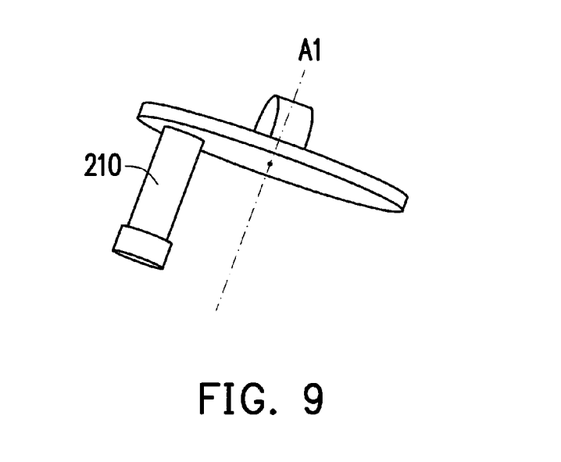
FIG. 9 is a schematic diagram of a driving pin of a driving mechanism of FIG. 8.

FIG. 8 is a schematic diagram of the image capturing module of FIG. 2 according to another embodiment of the invention. FIG. 9 is a schematic diagram of a driving pin of the driving mechanism of FIG. 8, where the driving pin is not illustrated in FIG. 8. Referring to FIG. 8 and FIG. 9, the image capturing module of the present embodiment is similar to the image capturing module of the embodiment of FIG. 3A and FIG. 3B, where elements with the same functions and shapes are denoted by the same referential numbers, and detailed contents and designs thereof can refer to related descriptions of the embodiment of FIG. 3A and FIG. 3B, which are not repeated. Moreover, a driving mechanism 200 of the present embodiment is different to the driving mechanism 126 of the aforementioned embodiment, and an operation method of the driving mechanism 200 applied to the image capturing module 120 is described below.

In the present embodiment, the driving mechanism 200 has a driving pin 210. A position of the driving pin 210 is away from a rotation axis A1 to present an eccentric state. The circuit board 222 correspondingly has a guide slot 222a. The driving pin 210 penetrates through the guide slot 222a. When the driving mechanism 200 rotates relative to the housing 212, the driving pin 210 pushes or pulls an edge of the guide slot 222a to drive the circuit board 222 to move.

For example, the guide slot 222a has a straight bar shape, and an extending direction E of the guide slot 222a is perpendicular to a moving direction D of the circuit board 222. Although the guide slot 222a having a straight bar shape is taken as an example for descriptions, the sprit of the invention is met as long as the driving pin can push or pull the edge of the guide slot to drive the circuit board to move when the driving mechanism rotates relative to the housing.

Figure 10A:
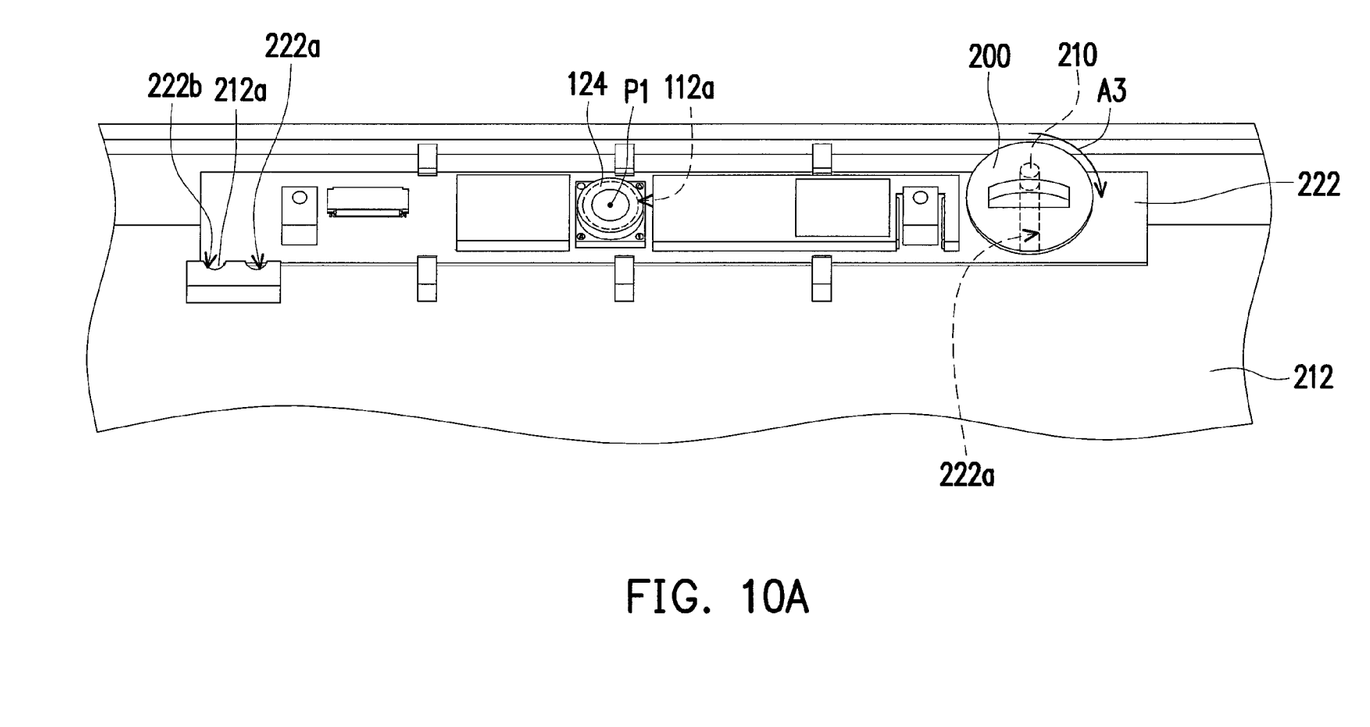
FIG. 10A is a schematic diagram illustrating a situation that the image capturing module of FIG. 8 is aligned to an opening and is exposed.
Figure 10B:
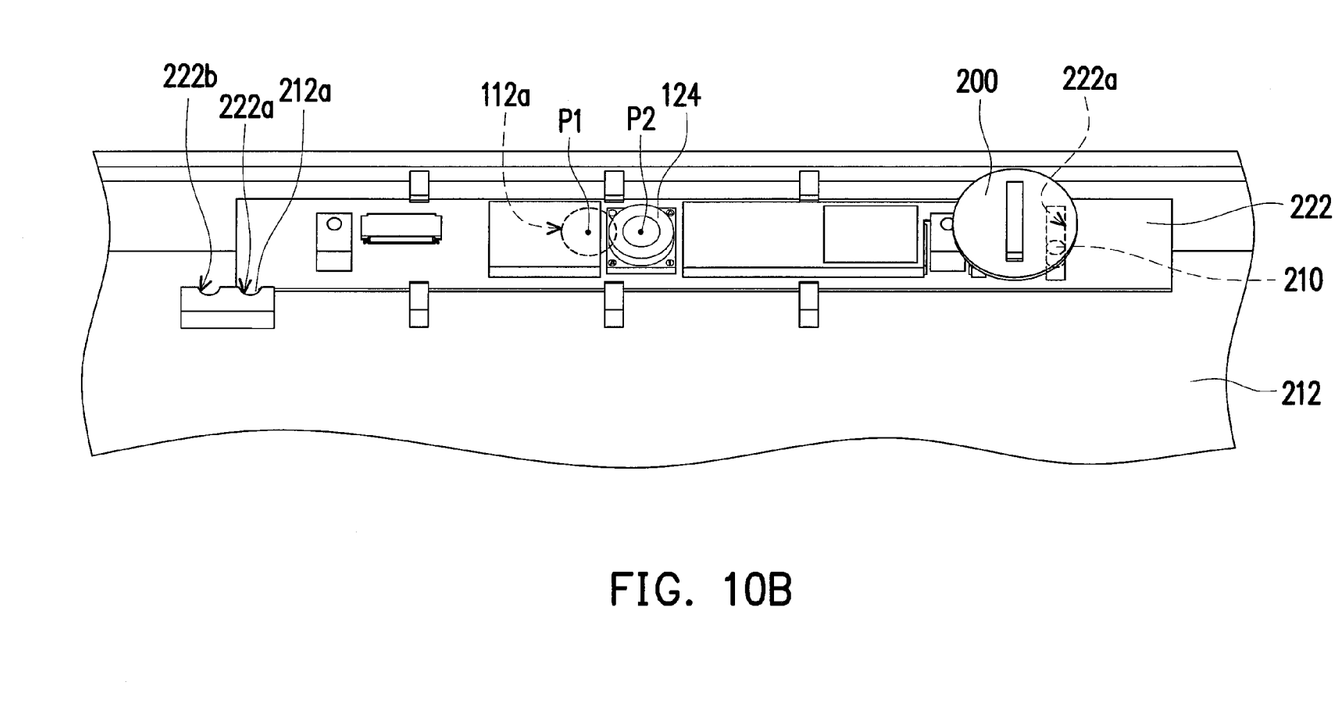
FIG. 10B is a schematic diagram illustrating a situation that the image capturing module of FIG. 8 moves relative to a housing and is shielded.

FIG. 10A is a schematic diagram illustrating a situation that the image capturing module of FIG. 8 is aligned to the opening and is exposed. FIG. 10B is a schematic diagram illustrating a situation that the image capturing module of FIG. 8 moves relative to the housing and is shielded. In FIG. 10A and FIG. 10B, the opening is represented by dot lines, and a part of the housing is omitted to facilitate describing the members covered by the housing. Referring to FIG. 10A and FIG. 10B, the housing 212 further has a first pit 212a and a second pit 212b. The circuit board 222 has a positioning bump 222b.

When the image capturing unit 124 moves correspondingly to the first position P1 aligned to the opening 112a and is exposed, the first pit 212a is engaged to the positioning bump 222b, so as to prevent the driving pin 210 from further driving the circuit board 222 to move relative to the housing 212, and fix positions of the driving pin 210 and the circuit board 222, as that shown in FIG. 10A. In this way, the image capturing unit 124 is kept in the first position P1 aligned to the opening 112a and is exposed. When a suitable force is exerted to rotate the driving mechanism 200 to drive the positioning bump 222b of the circuit board 222 to leave the first pit 212a and rotate by a predetermined angle A3 (for example, 90 degrees), the second pit 212b is engaged to the positioning bump 222b, so as to prevent the driving pin 210 from further driving the circuit board 222 to move relative to the housing 212, and fix positions of the driving pin 210 and the circuit board 222, by which the image capturing unit 124 is kept leaving the opening 112a and is shielded at the second position P2, as that shown in FIG. 10B. Certainly, the positioning bump can also be configured on the housing, and the first pit and the second pit are correspondingly configured on the circuit board, by which the same effect is achieved. The positioning method is not limited by the invention, and any positioning method can be used as long as a suitable positioning force is provided between the circuit board and the housing.

In summary, the driving mechanism is configured in the portable electronic device to control exposing or shielding of the image capturing unit. Therefore, the user can rotate the driving mechanism according to an actual requirement, such that the image capturing unit is exposed by the opening or leaves correspondingly the opening and is shielded. In this way, in case that the user does not use the image capturing unit, images of the user cannot be captured and transmitted, so as to effectively protect the user's privacy.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A portable electronic device, comprising:
a first body, having a housing with an opening; and
an image capturing module, movably disposed in the housing, comprising:
a circuit board;

an image capturing unit, disposed on the circuit board; and a driving mechanism, disposed in the housing and configured to drive the circuit board, wherein when the driving mechanism is operated in a first state, the driving mechanism drives the circuit board to move towards a predetermined direction relative to the housing, so that the image capturing unit moves correspondingly to a first position aligned to the opening and is exposed, and when the driving mechanism is operated in a second state, the driving mechanism drives the circuit board to move towards another predetermined direction relative to the housing, so that the image capturing unit leaves correspondingly the opening to reach a second position and is shielded by the housing, the driving mechanism is rotatably disposed on the housing and comprises a follower and a rotary knob, the follower is disposed in the housing and is used to opportunely push the circuit board, the rotary knob is fixed to the follower and protrudes out of the housing, and the rotary knob drives the follower to rotate relative to the housing, so as to drive the circuit board to move.

2. The portable electronic device as claimed in claim 1, wherein the rotary knob has a set of hooks, the follower has a hole, and the set of hooks penetrate though the hole and are engaged to the hole.

3. The portable electronic device as claimed in claim 1, wherein the follower is an elliptic plate having two ends, and an edge of the follower is configured to contact an edge of the circuit board.

4. The portable electronic device as claimed in claim 3, wherein the housing of the portable electronic device has a first positioning pillar and a second positioning pillar relative to the rotary knob, at least one end of the follower has a notch, when the image capturing unit is aligned to the opening and is exposed at the first position, the notch is engaged to the first positioning pillar, and when the rotary knob drives the notch of the follower to leave the first positioning pillar and rotate by a predetermined angle, the notch is engaged to the second positioning pillar, and the image capturing unit leaves correspondingly the opening and is shielded at the second position.

5. The portable electronic device as claimed in claim 1, wherein the housing of the portable electronic device has a plurality of position limiting parts for limiting the circuit board to move relative to the housing only along a single direction.

6. The portable electronic device as claimed in claim 5, wherein the position limiting parts comprise a plurality of buckle portions and a plurality of supporting portions, the circuit board has a first surface and a second surface opposite to the first surface, the buckle portions press the first surface of the circuit board, and the second surface of the circuit board leans against the supporting portions.

7. The portable electronic device as claimed in claim 1, further comprising an elastic element connected between the housing and the circuit board, wherein the elastic element provides an elastic force to the circuit board along a direction opposite to a force exerting direction of the driving mechanism, so that the circuit board is recovered to an original position in case that the driving mechanism does not exert a force.

8. The portable electronic device as claimed in claim 7, wherein the housing further has a hook, the circuit board has a through hole, and two ends of the elastic element respectively hook the hook and penetrate through the through hole.

9. The portable electronic device as claimed in claim 7, wherein the housing further has a first hook, the circuit board further has a second hook, and two ends of the elastic element respectively hook the first hook and the second hook.

10. The portable electronic device as claimed in claim 1, further comprising a touch screen assembled to the housing of the first body.

11. The portable electronic device as claimed in claim 1, further comprising a second body pivotally connected to the first body, wherein the first body further has a display screen, and the second body has a keyboard.

12. A portable electronic device, comprising:
a first body, having a housing with an opening; and
an image capturing module, movably disposed in the housing, comprising:
a circuit board;
an image capturing unit, disposed on the circuit board; and
a driving mechanism, disposed in the housing and configured to drive the circuit board, wherein when the driving mechanism is operated in a first state, the driving mechanism drives the circuit board to move towards a predetermined direction relative to the housing, so that the image capturing unit moves correspondingly to a first position aligned to the opening and is exposed, and when the driving mechanism is operated in a second state, the driving mechanism drives the circuit board to move towards another predetermined direction relative to the housing, so that the image capturing unit leaves correspondingly the opening to reach a second position and is shielded by the housing, wherein the driving mechanism is rotatably disposed in the housing and has a driving pin, a position of the driving pin is away from a rotation axis to present an eccentric state, the circuit board correspondingly has a guide slot, the driving pin penetrates through the guide slot, and when the driving mechanism rotates relative to the housing, the driving pin pushes or pulls an edge of the guide slot to drive the circuit board to move.

13. The portable electronic device as claimed in claim 12, wherein the guide slot has a straight bar shape, and an extending direction of the guide slot is perpendicular to a moving direction of the circuit board.

14. The portable electronic device as claimed in claim 12, wherein the housing further has a first pit and a second pit, the circuit board has a positioning bump, when the image capturing unit moves correspondingly to the first position aligned to the opening and is exposed, the first pit is engaged to the positioning bump, and when the rotation mechanism drives the positioning bump of the circuit board to leave the first pit and rotate by a predetermined angle, the second pit is engaged to the positioning bump, and the image capturing unit leaves correspondingly the opening and is shielded at the second position.

15. The portable electronic device as claimed in claim 12, wherein the housing of the portable electronic device has a plurality of position limiting parts for limiting the circuit board to move relative to the housing only along a single direction.

16. The portable electronic device as claimed in claim 15, wherein the position limiting parts comprise a plurality of buckle portions and a plurality of supporting portions, the circuit board has a first surface and a second surface opposite to the first surface, the buckle portions press the first surface of the circuit board, and the second surface of the circuit board leans against the supporting portions.

17. The portable electronic device as claimed in claim 12, further comprising a touch screen assembled to the housing of the first body.

18. The portable electronic device as claimed in claim 12, further comprising a second body pivotally connected to the first body, wherein the first body further has a display screen, and the second body has a keyboard.

* * * * *